US011814479B2

(12) United States Patent
Li et al.

(10) Patent No.: US 11,814,479 B2
(45) Date of Patent: Nov. 14, 2023

(54) COMPOSITION, METHOD FOR THE MANUFACTURE THEREOF, ARTICLE FORMED THEREFROM, AND REINFORCED THERMOPLASTIC COMPOSITE COMPRISING THE COMPOSITION

(71) Applicant: SHPP GLOBAL TECHNOLOGIES B.V., Bergen op Zoom (NL)

(72) Inventors: Yi Li, Guilderland, NY (US); Kayoko Onda, Tochigi (JP)

(73) Assignee: SHPP Global Technologies B.V., Bergen op Zoom (NL)

( * ) Notice: Subject to any disclaimer, the term of this patent is extended or adjusted under 35 U.S.C. 154(b) by 0 days.

(21) Appl. No.: 17/922,040

(22) PCT Filed: Mar. 23, 2021

(86) PCT No.: PCT/IB2021/052412
§ 371 (c)(1),
(2) Date: Oct. 28, 2022

(87) PCT Pub. No.: WO2021/220072
PCT Pub. Date: Nov. 4, 2021

(65) Prior Publication Data
US 2023/0159701 A1    May 25, 2023

(30) Foreign Application Priority Data

Apr. 30, 2020   (EP) .................................... 20172451

(51) Int. Cl.
| | |
|---|---|
| *C08G 65/48* | (2006.01) |
| *C08G 69/14* | (2006.01) |
| *C08G 69/26* | (2006.01) |
| *C08J 5/04* | (2006.01) |
| *C08K 5/20* | (2006.01) |
| *C08L 23/16* | (2006.01) |
| *C08L 25/06* | (2006.01) |
| *C08L 25/08* | (2006.01) |
| *C08L 53/00* | (2006.01) |
| *C08K 5/053* | (2006.01) |

(52) U.S. Cl.
CPC ........... *C08G 65/485* (2013.01); *C08G 69/14* (2013.01); *C08G 69/26* (2013.01); *C08J 5/042* (2013.01); *C08K 5/053* (2013.01); *C08K 5/20* (2013.01); *C08L 23/16* (2013.01); *C08L 25/06* (2013.01); *C08L 25/08* (2013.01); *C08L 53/005* (2013.01); *C08L 2205/025* (2013.01); *C08L 2205/035* (2013.01)

(58) Field of Classification Search
CPC ........ C08L 53/00; C08L 53/005; C08L 53/02; C08L 53/025; C08L 71/12; C08L 71/08; C08L 71/10; C08L 77/00; C08L 77/02; C08L 77/06; C08F 293/00; C08F 293/05; C08G 18/4879; C08G 65/485; C08G 69/14; C08G 69/02; C08G 69/026
See application file for complete search history.

(56) References Cited

U.S. PATENT DOCUMENTS

| | | | |
|---|---|---|---|
| 2,071,250 | A | 2/1937 | Carothers |
| 2,071,251 | A | 2/1937 | Carothers |
| 2,130,523 | A | 9/1938 | Carothers |
| 2,130,948 | A | 9/1938 | Carothers |
| 2,241,322 | A | 5/1941 | Hanford |
| 2,312,966 | A | 3/1943 | Hanford |
| 2,512,606 | A | 6/1950 | Bolton |
| 4,970,272 | A | 11/1990 | Gallucci |
| 5,248,728 | A * | 9/1993 | Lee, Jr. ................... C08L 71/12 525/905 |
| 7,226,963 | B2 | 6/2007 | Koevoets et al. |
| 7,354,533 | B2 | 4/2008 | Yeager et al. |
| 8,617,702 | B2 | 12/2013 | Jha et al. |
| 2004/0068053 | A1 | 4/2004 | Adedeji et al. |
| 2005/0171262 | A1 | 8/2005 | Miyoshi et al. |
| 2006/0199903 | A1 | 9/2006 | Miyoshi et al. |
| 2007/0167570 | A1 | 7/2007 | Miyoshi |
| 2012/0029129 | A1 | 2/2012 | Ting et al. |
| 2013/0062576 | A1 | 3/2013 | Jha et al. |
| 2018/0112059 | A1* | 4/2018 | Fujii ........................ C08K 5/01 |
| 2018/0134856 | A1 | 5/2018 | Nomura et al. |

FOREIGN PATENT DOCUMENTS

| | | | |
|---|---|---|---|
| EP | 0395994 A2 * | 11/1990 | |
| EP | 0747439 A2 | 12/1996 | |
| EP | 2855746 B1 * | 2/2017 | ............. C08G 65/38 |
| JP | 2004007967 A | 1/2004 | |
| JP | 2013023573 A | 2/2013 | |
| JP | 2017210514 A | 11/2017 | |
| WO | 0233000 A2 | 4/2002 | |
| WO | 2012001537 A1 | 1/2012 | |
| WO | 2016139826 A1 | 9/2016 | |

(Continued)

OTHER PUBLICATIONS

International Search Report for the corresponding International Application No. PCT/IB2021/052412, International Filing Date: Mar. 23, 2021; dated Aug. 27, 2021; 5 pages.

(Continued)

*Primary Examiner* — Irina S Zemel
*Assistant Examiner* — Jeffrey S Lenihan
(74) *Attorney, Agent, or Firm* — CANTOR COLBURN LLP

(57) ABSTRACT

A composition includes particular amounts a poly(phenylene ether), a first polyamide, hydrogenated block copolymer of an alkenyl aromatic and a conjugated diene, pentaerythritol tetrastearate, and bisphenoxyethanol fluorene. The composition can be particularly well-suited for use in a reinforced thermoplastic composition including a reinforcing carbon filler.

11 Claims, No Drawings

(56) References Cited

FOREIGN PATENT DOCUMENTS

WO      2017026250 A1    2/2017
WO      2020022356 A1    1/2020

OTHER PUBLICATIONS

Written Opinion for the corresponding International Application No. PCT/IB2021/052412, International Filing Date: Mar. 23, 2021; dated Aug. 27, 2021; 7 pages.

* cited by examiner

COMPOSITION, METHOD FOR THE MANUFACTURE THEREOF, ARTICLE FORMED THEREFROM, AND REINFORCED THERMOPLASTIC COMPOSITE COMPRISING THE COMPOSITION

CROSS-REFERENCE TO RELATED APPLICATION

This application is a National Stage application of PCT/IB2021/052412, filed Mar. 23, 2021, which claims priority to and the benefit of European Application No. 20172451.5, filed on Apr. 30, 2020, the contents of both of which are incorporated by reference herein in their entirety.

BACKGROUND

Polyphenylene ethers have been blended with polyamides to provide compositions having a wide variety of beneficial properties such as heat resistance, chemical resistance, impact strength, hydrolytic stability, and dimensional stability. In some applications it can be desirable to use poly(phenylene ether)/polyamide compositions with good melt flow, low water uptake, and good mechanical properties. Unfortunately, it can be difficult to achieve such a desirable balance of properties. For example, polyamides are well-known thermoplastic polymers having properties such as high melt flow, and excellent processability and chemical resistance. However, polyamide tends to absorb water over time, which can lead to warpage as well as low retention of mechanical strength. Several poly(phenylene ether)/polyamide blends are known and can exhibit low moisture uptake, however the melt flow is generally not sufficient for some applications, for example as a matrix material for fiber reinforced thermoplastic composites. Other poly(phenylene ether)/polyamide blends can exhibit high melt flow, however the water uptake can be higher than the lower melt flow counterparts.

There accordingly remains a need in the art for polyphenylene ether/polyamide compositions exhibiting a combination of high melt flow and low water uptake.

SUMMARY

A composition comprises 10 to 65 weight percent of a poly(phenylene ether); 30 to 70 weight percent of a first polyamide, wherein the first polyamide is polyamide-6, polyamide-6,6, or a combination thereof; 1 to 10 weight percent of a hydrogenated block copolymer of an alkenyl aromatic and a conjugated diene; and 0.5 to 10 weight percent of bisphenoxyethanol fluorene; wherein weight percent of each component is based on the total weight of the composition.

A method for the manufacture of the composition comprises melt mixing the components of the composition.

An article formed from the composition of represents another aspect of the present disclosure.

The above described and other features are exemplified by the following detailed description.

DETAILED DESCRIPTION

The present inventors have advantageously discovered a composition which can be particularly well suited as a matrix resin for use in carbon fiber reinforced thermoplastics, for example for automotive applications. The compositions described herein can exhibit the desirable combination of high melt flow, low moisture absorption, high heat resistance, and good impact performance.

Accordingly, an aspect of the present disclosure is a poly(phenylene ether)/polyamide composition. In particular, the composition includes particular amounts of a poly(phenylene ether), a first polyamide, a hydrogenated block copolymer of an alkenyl aromatic and a conjugated diene, and bisphenoxyethanol fluorene.

The composition comprises a poly(phenylene ether) (also referred to herein as "PPE"). The poly(phenylene ether) comprises phenylene ether units having the structure

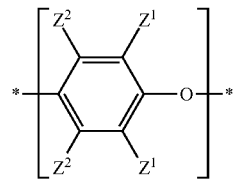

wherein each occurrence of Z1 is independently halogen, unsubstituted or substituted $C_{1-12}$ hydrocarbyl, provided that the hydrocarbyl group is not tertiary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms; and each occurrence of $Z^2$ is independently hydrogen, halogen, unsubstituted or substituted $C_{1-12}$ hydrocarbyl provided that the hydrocarbyl group is not tertiary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms. The poly(phenylene ether) can have aminoalkyl-containing end group(s), typically located in a position ortho to the hydroxy group. As one example, $Z^1$ can be a di-n-butylaminomethyl group formed by reaction of a terminal 3,5-dimethyl-1,4-phenyl group with the di-n-butylamine component of an oxidative polymerization catalyst. Also frequently present are tetramethyldiphenoquinone (TMDQ) end groups, typically obtained from 2,6-dimethylphenol—containing reaction mixtures in which tetramethyldiphenoquinone by-product is present. The poly(phenylene ether) can be in the form of a homopolymer, a random copolymer, a graft copolymer, or a block copolymer, as well as a combination thereof. In an aspect, the poly(phenylene ether) is a homopolymer, preferably poly(2,6-dimethyl-1,4-phenylene ether).

In an aspect, the poly(phenylene ether) has an intrinsic viscosity of 0.2 to 1 deciliter per gram measured by Ubbelohde viscometer at 25° C. in chloroform. Within this range, the poly(phenylene ether) intrinsic viscosity can be 0.2 to 0.6 deciliter per gram, or 0.25 to 0.5 deciliter per gram, or 0.3 to 0.5 deciliter per gram, or 0.35 to 0.5 deciliter per gram.

In a specific aspect, the poly(phenylene ether) is a poly(2,6-dimethyl-1,4-phenylene ether) having an intrinsic viscosity of 0.2 to 0.6 deciliter per gram, measured by Ubbelohde viscometer at 25° C. in chloroform. Within the range of 0.2 to 0.6 deciliter per gram, the poly(2,6-dimethyl-1,4-phenylene ether) intrinsic viscosity can be 0.3 to 0.5 deciliter per gram, more preferably 0.35 to 0.5 deciliter per gram.

The composition includes the poly(phenylene ether) in an amount of 10 to 65 weight percent, based on the total weight of the composition. Within this range, the PPE amount can be 10 to 40 weight percent, or 15 to 35 weight percent, or 15 to 25 weight percent, or 25 to 35 weight percent, or 20 to 40 weight percent.

In addition to the poly(phenylene ether), the composition comprises a first polyamide. Polyamides, also known as nylons, are polymers containing amide (i.e., —C(=O)NH—) linking groups, for example as described in U.S. Pat. No. 4,970,272 to Gallucci. Polyamides that can be used as the first polyamide include polyamide-6, polyamide-6,6, or a combination thereof. Polyamide-6 and polyamide-6,6 are commercially available from a number of sources and methods for their preparation are known. For example, polyamides can be obtained by a number of well-known processes such as those described in U.S. Pat. Nos. 2,071,250, 2,071,251, 2,130,523, and 2,130,948 to Carothers; 2,241,322 and 2,312,966 to Hanford; and 2,512,606 to Bolton et al.

The first polyamide can have a particular amine end-group concentration. For example, the first polyamide can have an amine end-group concentration of 40 to 115 milliequivalents per kilogram. In an aspect, the first polyamide can have an amine end-group concentration of less than 75 milliequivalents per kilogram, for example 40 to 70 milliquivalents per kilogram. In an aspect, the first polyamide can have an amine end-group concentration of greater than 85 milliequivalents per kilogram, for example 90 to 115 milliequivalents per kilogram Amine end group content can be determined by dissolving the polyamide in a suitable solvent and titrating with 0.01 normal hydrochloric acid (HC1) solution using a suitable indication method. The amount of amine end groups is calculated based the volume of HC1 solution added to the sample, the volume of HC1 used for the blank, the molarity of the HC1 solution, and the weight of the polyamide sample.

The first polyamide can be present in an amount of 30 to 70 weight percent, based on the total weight of the composition. Within this range, the first polyamide can be present in an amount of 60 to 70 weight percent, or 50 to 65 weight percent, or 50 to 60 weight percent, or 40 to 55 weight percent, or 30 to 50 weight percent, or 30 to 60 weight percent. In an aspect, the first polyamide can be polyamide-6, and the first polyamide can be present in an amount of less than or equal to 50 weight percent (i.e., 30 to 50 weight percent). In an aspect, the first polyamide can be polyamide-6,6, and the first polyamide can be present in an amount of less than or equal to 60 weight percent (i.e., 30 to 60 weight percent).

In addition to the poly(phenylene ether) and the first polyamide, the composition comprises a hydrogenated block copolymer of an alkenyl aromatic monomer and a conjugated diene. For brevity, this component is referred to as the "hydrogenated block copolymer". The hydrogenated block copolymer can comprise 10 to 90 weight percent of poly (alkenyl aromatic) content and 90 to 10 weight percent of hydrogenated poly(conjugated diene) content, based on the weight of the hydrogenated block copolymer. In an aspect, the hydrogenated block copolymer is a low poly(alkenyl aromatic content) hydrogenated block copolymer in which the poly(alkenyl aromatic) content is 10 to less than 40 weight percent, specifically 20 to 35 weight percent, more specifically 25 to 35 weight percent, yet more specifically 25 to 30 weight percent, all based on the weight of the low poly(alkenyl aromatic) content hydrogenated block copolymer. In other aspects, the hydrogenated block copolymer is a high poly(alkenyl aromatic content) hydrogenated block copolymer in which the poly(alkenyl aromatic) content is 40 to 90 weight percent, specifically 50 to 80 weight percent, more specifically 60 to 70 weight percent, all based on the weight of the high poly(alkenyl aromatic content) hydrogenated block copolymer.

In an aspect, the hydrogenated block copolymer has a weight average molecular weight of 40,000 to 400,000 grams per mole (g/mole or daltons, Da). The number average molecular weight and the weight average molecular weight can be determined by gel permeation chromatography and based on comparison to polystyrene standards. In an aspect, the hydrogenated block copolymer has a weight average molecular weight of 200,000 to 400,000 grams per mole, specifically 220,000 to 350,000 grams per mole. In other aspects, the hydrogenated block copolymer has a weight average molecular weight of 40,000 to 200,000 grams per mole, specifically 40,000 to 180,000 grams per mole, more specifically 40,000 to 150,000 grams per mole.

The alkenyl aromatic monomer used to prepare the hydrogenated block copolymer can have the structure

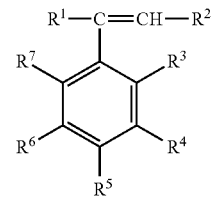

wherein $R^1$ and $R^2$ each independently represent a hydrogen atom, a $C_{1-8}$ alkyl group, or a $C^{2-8}$ alkenyl group; $R^3$ and $R^7$ each independently represent a hydrogen atom, a $C_{1-8}$ alkyl group, a chlorine atom, or a bromine atom; and $R^4$, $R^5$, and $R^6$ each independently represent a hydrogen atom, a $C_{1-8}$ alkyl group, or a $C_{2-8}$ alkenyl group, or $R^4$ and $R^5$ are taken together with the central aromatic ring to form a naphthyl group, or $R^5$ and $R^6$ are taken together with the central aromatic ring to form a naphthyl group. Specific alkenyl aromatic monomers include, for example, styrene, chlorostyrenes such as p-chlorostyrene, methylstyrenes such as alpha-methylstyrene and p-methylstyrene, and t-butylstyrenes such as 3-t-butylstyrene and 4-t-butylstyrene. In an aspect, the alkenyl aromatic monomer is styrene.

The conjugated diene used to prepare the hydrogenated block copolymer can be a $C_{4-20}$ conjugated diene. Suitable conjugated dienes include, for example, 1,3-butadiene, 2-methyl-1,3-butadiene, 2-chloro-1,3-butadiene, 2,3-dimethyl-1,3-butadiene, 1,3-pentadiene, 1,3-hexadiene, and the like, and combinations thereof. In an aspect, the conjugated diene is 1,3-butadiene, 2-methyl-1,3-butadiene, or a combination thereof. In an aspect, the conjugated diene is 1,3-butadiene.

The hydrogenated block copolymer is a copolymer comprising (A) at least one block derived from an alkenyl aromatic compound and (B) at least one block derived from a conjugated diene, in which the aliphatic unsaturated group content in the block (B) is at least partially reduced by hydrogenation. In an aspect, the aliphatic unsaturation in the (B) block is reduced by at least 50 percent, specifically at least 70 percent. The arrangement of blocks (A) and (B) includes a linear structure, a grafted structure, and a radial teleblock structure with or without a branched chain. Linear block copolymers include tapered linear structures and non-tapered linear structures. In an aspect, the hydrogenated block copolymer has a tapered linear structure. In an aspect, the hydrogenated block copolymer has a non-tapered linear structure. In an aspect, the hydrogenated block copolymer comprises a (B) block that comprises random incorporation of alkenyl aromatic monomer. Linear block copolymer structures include diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of (A) and (B), wherein the molecular weight of each (A) block can be the same as or different from that of other (A) blocks, and the molecular weight of each (B) block can be the same as or different from that of other (B) blocks. In an aspect, the hydrogenated block copolymer is a diblock copolymer, a triblock copolymer, or a combination thereof.

In an aspect, the hydrogenated block copolymer excludes the residue of monomers other than the alkenyl aromatic compound and the conjugated diene. In an aspect, the hydrogenated block copolymer consists of blocks derived from the alkenyl aromatic compound and the conjugated diene. It does not comprise grafts formed from these or any other monomers. It also consists of carbon and hydrogen atoms and therefore excludes heteroatoms. In an aspect, the hydrogenated block copolymer includes the residue of one or more acid functionalizing agents, such as maleic anhydride. In an aspect, the hydrogenated block copolymer comprises a polystyrene-poly(ethylene-butylene)-polystyrene triblock copolymer.

In an aspect, the hydrogenated block copolymer is a polystyrene-poly(ethylene-butylene)-polystyrene triblock copolymer having a polystyrene content of 25 to 35 weight percent, based on the weight of the polystyrene-poly(ethylene-butylene)-polystyrene triblock copolymer. In these aspects, the polystyrene-poly(ethylene-butylene)-polystyrene triblock copolymer can, optionally, have a weight average molecular weight of 240,000 to 300,000 grams per mole, determined by to size exclusion chromatography using polystyrene standards.

In an aspect, the hydrogenated block copolymer is a polystyrene-poly(ethylene-propylene) diblock copolymer. In an aspect, the hydrogenated block copolymer can comprise a polystyrene-poly(ethylene-propylene) diblock copolymer, or a polystyrene-poly(ethylene-butylene)-polystyrene triblock copolymer, or a combination thereof. In a specific aspect, the composition comprises a combination of a polystyrene-poly(ethylene-propylene) diblock copolymer and a polystyrene-poly(ethylene-butylene)-polystyrene triblock copolymer. When present, the polystyrene-poly(ethylene-propylene) diblock copolymer can preferably have a styrene content of 30 to 45 weight percent.

Methods for preparing hydrogenated block copolymers are known in the art and many hydrogenated block copolymers are commercially available. Illustrative commercially available hydrogenated block copolymers include the polystyrene-poly(ethylene-propylene) diblock copolymers available from Kraton Performance Polymers Inc. as KRATON™ G1701 (having about 37 weight percent polystyrene) and G1702 (having about 28 weight percent polystyrene); the polystyrene-poly(ethylene-butylene)-polystyrene triblock copolymers available from Kraton Performance Polymers Inc. as KRATON™ G1641 (having about 33 weight percent polystyrene), G1650 (having about 30 weight percent polystyrene), G1651 (having about 33 weight percent polystyrene), and G1654 (having about 31 weight percent polystyrene); and the polystyrene-poly(ethylene-ethylene/propylene)-polystyrene triblock copolymers available from Kuraray as SEPTON™ S4044, S4055, S4077, and S4099. Additional commercially available hydrogenated block copolymers include polystyrene-poly(ethylene-butylene)-polystyrene (SEBS) triblock copolymers available from Dynasol as CALPRENE™ H6140 (having about 31 weight percent polystyrene), H6170 (having about 33 weight percent polystyrene), H6171 (having about 33 weight percent polystyrene), and H6174 (having about 33 weight percent polystyrene); and from Kuraray as SEPTON™ 8006 (having about 33 weight percent polystyrene) and 8007 (having about 30 weight percent polystyrene); polystyrene-poly(ethylene-propylene)-polystyrene (SEPS) copolymers available from Kuraray as SEPTON™ 2006 (having about 35 weight percent polystyrene) and 2007 (having about 30 weight percent polystyrene); and oil-extended compounds of these hydrogenated block copolymers available from Kraton Performance Polymers Inc. as KRATON™ G4609 (containing about 45% mineral oil, and the SEBS having about 33 weight percent polystyrene) and G4610 (containing about 31% mineral oil, and the SEBS having about 33 weight percent polystyrene); and from Asahi as TUFTEC™ H1272 (containing about 36% oil, and the SEBS having about 35 weight percent polystyrene). Mixtures of two of more hydrogenated block copolymers can be used.

In an aspect, the hydrogenated block copolymer has a weight average molecular weight of 40,000 to 400,000 grams per mole (g/mol). The number average molecular weight and the weight average molecular weight can be determined by gel permeation chromatography and based on comparison to polystyrene standards. In an aspect, the hydrogenated block copolymer has a weight average molecular weight of 200,000 to 400,000 g/mol, or 220,000 to 350,000 g/mol. In an aspect, the hydrogenated block copolymer has a weight average molecular weight of 40,000 to 200,000 g/mol, or 40,000 to 180,000 g/mol, or 40,000 to 150,000 g/mol.

The hydrogenated block copolymer can be present in an amount of 1 to 10 weight percent, based on the total weight of the composition. Within this range, the amount of the hydrogenated block copolymer can be 1 to 8 weight percent, or 1 to 5 weight percent.

In addition to the poly(phenylene ether), the first polyamide, and the hydrogenated block copolymer, the composition further comprises a bisphenoxyethanol fluorene The bisphenoxyethanol fluorene can be included in the composition in an amount of 0.5 to 10 weight percent, based on the total weight of the composition. Within this range, the bisphenoxyethanol fluorene can be present in an amount of 0.5 to 7 weight percent, or 0.5 to 6 weight percent, or 0.5 to 5 weight percent, or 1 to 5 weight percent.

In an aspect the composition can optionally further comprise stearyl erucamide. When present, the stearyl erucamide can be included in the composition in an amount of 1 to 10 weight percent, based on the total weight of the composition. Within this range, the stearyl erucamide can be present in an amount of 1 to 8 weight percent, or 1 to 7 weight percent, or 1 to 6 weight percent, or 1 to 5 weight percent.

In an aspect, the composition can optionally further comprise a polystyrene homopolymer. As used herein, the term "polystyrene homopolymer" or "homopolystyrene" refer to a homopolymer of styrene. Thus, the residue of any monomer other than styrene is excluded from the homopolystyrene. The homopolystyrene can be atactic, syndiotactic, or isotactic. In an aspect, the homopolystyrene consists of atactic homopolystyrene. In an aspect, the homopolystyrene has a melt flow rate of 1.5 to 10 grams per 10 minutes, or 3 to 10 grams per 10 minutes, or 4 to 10 grams per 10 minutes, measured at 200° C. and 5 kilogram load according to ASTM D-1238 or ISO 1133. When present, the polystyrene homopolymer can be included in the composition in an amount of 1 to 30 weight percent, based on the total weight of the composition. Within this range, the polystyrene homopolymer can be present in an amount of 5 to 30 weight percent or 5 to 25 weight percent, or 5 to 20 weight percent, or 1 to 20 weight percent.

The relative amount of each component can be adjusted to provide the desired combination of properties. As is understood by one of skill in the art, the amount of each component can be selected within the recited ranges such that they total 100 weight percent.

The composition can optionally further comprise an additive composition, comprising one or more additives selected to achieve a desired property, with the proviso that the additives are also selected so as to not significantly adversely affect a desired property of the composition. The additive composition or individual additives can be mixed at a suitable time during the mixing of the components for forming the composition. The additive composition can include flow modifier, filler (e.g., a particulate polytetrafluoroethylene (PTFE), glass, carbon, mineral, or metal), antioxidant, heat stabilizer, light stabilizer, ultraviolet (UV) light stabilizer, UV absorbing additive, plasticizer, lubricant, release agent (such as a mold release agent), antistatic agent, anti-fog agent, antimicrobial agent, colorant (e.g, a dye or pigment), surface effect additive, radiation stabilizer, flame retardant, anti-drip agent (e.g., a PTFE-encapsulated styrene-acrylonitrile copolymer (TSAN)), or a combination thereof. The additives are used in the amounts generally known to be effective. For example, the total amount of the additive composition (other than any impact modifier, filler, or reinforcing agent) can be 0.001 to 10 weight percent, or 0.1 to 10 weight percent, or 0.01 to 5 weight percent, each based on the total weight of the polymer in the composition. In an aspect the composition can exclude additives not specifically disclosed herein.

In an aspect the composition can further comprise a pentaerythritol tetrastearate flow promoter. When present, the pentaerythritol tetrastearate can be present in an amount of 0.1 to 5 weight percent. Within this range, the pentaerythritol tetrastearate can be present in an amount of 0.1 to 3 weight percent, or 0.1 to 2 weight percent, or 0.1 to 1 weight percent.

In a specific aspect, the composition can comprise 20 to 40 weight percent of the poly(phenylene ether), 50 to 65 weight percent of the polyamide, and 1 to 10 weight percent of the hydrogenated block copolymer, in particular wherein the hydrogenated block copolymer comprises a combination of a polystyrene-poly(ethylene-butylene)-polystyrene triblock copolymer and a polystyrene-poly(ethylene-propylene) diblock copolymer. In an aspect, the poly(phenylene ether) can be a poly(2,6-dimethyl-1,4-phenylene ether) having an intrinsic viscosity of 0.3 to 0.5 deciliter per gram, measured by Ubbelohde viscometer at 25° C. in chloroform.

In a specific aspect, the composition comprises 25 to 35 weight percent of the poly(phenylene ether), 50 to 60 weight percent of the polyamide, 1 to 10 weight percent of the hydrogenated block copolymer, and 0.5 to 10 weight percent of bisphenoxyethanol fluorene. In an aspect, the hydrogenated block copolymer can comprise a combination of a polystyrene-poly(ethylene-butylene)-polystyrene triblock copolymer and a polystyrene-poly(ethylene-propylene) diblock copolymer. In an aspect, the poly(phenylene ether) can be a poly(2,6-dimethyl-1,4-phenylene ether) having an intrinsic viscosity of 0.3 to 0.5 deciliter per gram, measured by Ubbelohde viscometer at 25° C. in chloroform.

In a specific aspect, the composition comprises 10 to 40 weight percent of the poly(phenylene ether), 40 to 55 weight percent of the polyamide, 1 to 10 weight percent of the hydrogenated block copolymer, 1 to 5 weight percent of stearyl erucamide, and 0.5 to 5 weight percent of bisphenoxyethanol fluorene. In an aspect, the hydrogenated block copolymer can comprise a polystyrene-poly(ethylene-propylene) diblock copolymer. In an aspect, the poly(phenylene ether) can be a poly(2,6-dimethyl-1,4-phenylene ether) having an intrinsic viscosity of 0.3 to 0.5 deciliter per gram, measured by Ubbelohde viscometer at 25° C. in chloroform.

In a specific aspect, the composition comprises 15 to 25 weight percent of the poly(phenylene ether), 45 to 55 weight percent of the first polyamide, 1 to 10 weight percent of the hydrogenated block copolymer, 10 to 20 weight percent of the polystyrene homopolymer, and 0.5 to 10 weight percent of the bisphenoxyethanol fluorene. In an aspect, the hydrogenated block copolymer can comprise a combination of a polystyrene-poly(ethylene-butylene)-polystyrene triblock copolymer and a polystyrene-poly(ethylene-propylene) diblock copolymer. In an aspect, the poly(phenylene ether) can be a poly(2,6-dimethyl-1,4-phenylene ether) having an intrinsic viscosity of 0.3 to 0.5 deciliter per gram, measured by Ubbelohde viscometer at 25° C. in chloroform.

The composition of the present disclosure can exhibit one or more advantageous properties. For example, the composition can have a notched Charpy impact strength of greater than 5 kilojoules per meter$^2$, or greater than 10 kilojoules per meter$^2$, or greater than 15 kilojoules per meter$^2$. The composition can have a water absorption of less than 1%, or less than 0.9%, or less than 0.8%, or less than 0.75%, or less than 0.7%, or less than 0.6%, or less than 0.5%, or less than 0.5%, or 0.01 to 0.75%, or 0.05 to 0.5%. The composition can have a melt volume flow rate of greater than 10 cm$^3$/10 minutes, or greater than 12 cm$^3$/10 minutes, or greater than 15 cm$^3$/10 minutes. The aforementioned properties can be determined, for example, according to the test standards further described in the working examples below.

The composition can comprise 10 to 65 weight percent of a poly(phenylene ether); 30 to 70 weight percent of a first polyamide, wherein the first polyamide is polyamide-6, polyamide-6,6, or a combination thereof; 1 to 10 weight percent of a hydrogenated block copolymer of an alkenyl aromatic and a conjugated diene; and 0.5 to 10 weight percent of bisphenoxyethanol fluorene; wherein weight percent of each component is based on the total weight of the composition. The first polyamide can be polyamide-6, and can be present in an amount of less than or equal to 50 weight percent. The first polyamide can be polyamide-6,6, and can be present in an amount of less than or equal to 60 weight percent. The first polyamide can have an amine end group concentration of less than 75 milliequivalents per kilogram, preferably 40 to 70 milliequivalents per kilogram; or an amine end group concentration of greater than 85 milliequivalents per kilogram, preferably 90 to 115 milliequivalents per kilogram. The hydrogenated block copolymer can be a polystyrene-poly(ethylene-butylene)-polystyrene triblock copolymer, a polystyrene-poly(ethylene-propylene) diblock copolymer, or a combination thereof, preferably wherein the polystyrene-poly(ethylene-propylene) diblock copolymer can have a styrene content of 30 to 45 weight percent. The composition can comprise 0.1 to 10 weight percent of one or more additives.

The composition can generally be prepared by any method. In an aspect, the composition can be prepared by melt mixing the components of the composition. For example, the composition can be formed by combining the components of the composition. In an aspect, the components of the composition can be dry blended, and the dry blend can be added into an upstream port of an extruder. The dry blend can then be melt mixed. In an aspect, the polyamide and, when present, any filler, can be added to the melt mix using separate downstream feeders. Typical melt mixing temperatures can be 250 to 315° C. Molded articles can be formed from the composition, for example, by injection molding or extrusion. An exemplary method for the manufacture of the composition is further described in the working examples below.

The composition can be useful in various applications, in particular, automotive applications. Thus, another aspect of the present disclosure is an article formed from the composition in any of its above-described variations. Such articles include components employed in the interiors of vehicles including automobiles, aircraft, ships, trains, and subway cars. A specific article is an automotive component.

The composition of the present disclosure can also be useful as a component of a reinforced thermoplastic composite, in particular, a carbon fiber reinforced thermoplastic composite. A reinforced thermoplastic composite can therefore include the above-described composition and a reinforcing filler. The reinforcing filler can be, for example, mica, clay, feldspar, quartz, quartzite, perlite, tripoli, diatomaceous earth, aluminum silicate (mullite), synthetic calcium silicate, fused silica, fumed silica, sand, boron-nitride powder, boron-silicate powder, calcium sulfate, calcium carbonates (such as chalk, limestone, marble, and synthetic precipitated calcium carbonates) talc (including fibrous, modular, needle shaped, and lamellar talc), wollastonite, hollow or solid glass spheres, silicate spheres, cenospheres, aluminosilicate or (armospheres), kaolin, whiskers of silicon carbide, alumina, boron carbide, iron, nickel, or copper, continuous and chopped carbon fibers or glass fibers, molybdenum sulfide, zinc sulfide, barium titanate, barium ferrite, barium sulfate, heavy spar, TiO2, aluminum oxide, magnesium oxide, particulate or fibrous aluminum, bronze, zinc, copper, or nickel, glass flakes, flaked silicon carbide, flaked aluminum diboride, flaked aluminum, steel flakes, natural fillers such as wood flour, fibrous cellulose, cotton, sisal, jute, starch, lignin, ground nut shells, or rice grain husks, reinforcing organic fibrous fillers such as poly(ether ketone), polyimide, polybenzoxazole, poly(phenylene sulfide), polyesters, polyethylene, aromatic polyamides, aromatic polyimides, polyetherimides, polytetrafluoroethylene, and poly(vinyl alcohol), as well a combination thereof. The fillers and reinforcing agents can be coated with a layer of metallic material to facilitate conductivity, or surface treated with silanes to improve adhesion and dispersion with the polymer matrix. In an aspect, the reinforcing filler is a reinforcing carbon fiber.

The reinforced thermoplastic composite can comprise 20 to 80 weight percent of the composition, based on the total weight of the composite. Within this range, the amount of the composition can be at least 30 weight percent, or at least 40 weight percent, or at least 50 weight percent, or least 60 weight percent. Also within this range, the amount of the composition can be at most 60 weight percent, or at most 50 weight percent, or at most 40 weight percent, or at most 30 weight percent. The reinforced thermoplastic composite can comprise 20 to 80 weight percent of the reinforcing filler (e.g., the reinforcing carbon fiber). Within this range, the amount of the reinforcing filler can be at least 30 weight percent, or at least 40 weight percent, or at least 50 weight percent, or least 60 weight percent. Also within this range, the amount of the reinforcing filler can be at most 60 weight percent, or at most 50 weight percent, or at most 40 weight percent, or at most 30 weight percent.

The composition of the present disclosure therefore provides a significant advantage with regard to certain properties, for example melt flow, water uptake, and impact strength. The composition exhibiting this desirable balance of properties can be particularly useful for forming articles for various applications, as well as for use in reinforced thermoplastic composite materials. Therefore, a significant advantage is provided by the present disclosure.

This disclosure is further illustrated by the following examples, which are non-limiting.

EXAMPLES

Materials for the following examples are described in Table 1.

| Component | Description | Supplier |
| --- | --- | --- |
| PPE/PA-1 | Blend of poly(2,6-dimethyl-1,4-phenylene ether) and polyamide-6,6 having at least 70 weight percent polyamide, obtained as NORYL ™ GTX 9400 W | SABIC |
| PPE/PA-2 | Blend of poly(2,6-dimethyl-1,4-phenylene ether) and polyamide-6,6, having a polyamide loading of 53%, obtained as NORYL ™ GTX918W | SABIC |
| PPE-1 | Poly(2,6-dimethyl-1,4-phenylene ether), CAS Reg. No. 24938-67-8, having an intrinsic viscosity of 0.40 deciliter per gram as measured in chloroform at 25° C.; obtained as PPO ™ 640 from SABIC | SABIC |
| PPE-2 | Poly(2,6-dimethyl-1,4-phenylene ether), CAS Reg. No. 24938-67-8, having an intrinsic viscosity of 0.46 deciliter per gram as measured in chloroform at 25° C.; obtained as PPO ™ 646 | SABIC |
| PA-1 | Polyamide-6,6, CAS Reg. No. 32131-17-2, having a viscosity number of 123-129 milliliters per gram and an amine end group concentration of 49-53 milliequivalents per kilogram; obtained as ASCEND VYDYNE ™ 21ZL | Ascend |
| PA-2 | Polyamide-6, having a relative viscosity of 34-42 deciliters per gram and an amine end group concentration of 58-66 milliequivalents per kilogram | Custom Resins |
| PA-3 | Polyamide-6,6, CAS Reg. No. 32131-17-2, having a relative viscosity of 34.5-37.5 deciliters per gram and an amine end group concentration of 40-44 milliequivalents per kilogra, obtained as ASCEND VYDYNE ™ 21LS Q622 | Ascend |

| Component | Description | Supplier |
| --- | --- | --- |
| BPEF | Bisphenoxyethanol fluorene, obtained as OGSOL MF-11 | Osaka Gas Chemicals |
| PS-1 | Polystyrene, having a melt flow rate of 9 grams per 10 minutes | DIC Corp. |
| Erucamide | Stearyl erucamide | Croda Universal |
| PETS | Pentaerythritol tetrastearate, CAS Reg. No. 115-83-3 | FACI |
| CuI | Cuprous iodide | DSM |
| CAA | Citric acid anhydride | INTERNATIONAL CHEMICAL INC |
| SEP-LS | Thermoplastic elastomer hydrogenated polystyrene-poly(ethylene-propylene) diblock copolymer, 26.2-29 wt % styrene, obtained as KRATON™ G1702 | Kraton |
| SEP-HS | High styrene hydrogenated polystyrene-poly(ethylene-propylene) diblock copolymer, 34.7-38.5 wt % polystyrene, obtained as KRATON™ G1701 | Kraton |
| PHBPP | Pentaerythritol 3-(4-hydroxy-3,5-di-tert-butylphenyl)propionate (1:4), CAS Reg. No. 6683-19-8; obtained as IRGANOX™ 1010 | BASF Corp. |
| SEBS | Polystyrene-poly(ethylene-butylene)-polystyrene triblock copolymer, CAS Reg. No. 66070-58-4, having a polystyrene content of 30-33 weight percent and a negligible melt flow, measured at 260 ° C. and 5 kilogram load according to ASTM D1238; obtained as KRATON™ G1651 | Kraton |
| KI | Potassium iodide | DEEPWATER CHEMICALS INC |
| PELTP | Pentaerythritol tetrakis(3-laurylthiopropionate), CAS Reg. No. 29598-76-3, obtained as SEENOX™412S | Crompton Specialties |
| Furandione | Furandione | EXXON CHEMICAL |
| CB | Carbon black (pigment); pH = 7.85; heating loss = 1.87 weight percent; sulfur = 0.45 weight percent; iodine absorption = 230.8 grams/kilogram; toluene discoloration number = 99.5 percent transmittance; solvent extractables = 0.01 weight percent; volatile constituents = 1.85 weight percent; obtained as VULCAN™ 9A32 | Cabot Corp. |

The compositions of the following examples were compounded on a Toshiba TEM-37BS 30-millimeter twin screw extruder in a single pass. All components except polyamide (except where specifically noted) were added at the feed throat of the extruded, and polyamides were added from a downstream side feeder. The extruder temperature settings (zones from upstream to downstream) were 240-270-290-290-290-290-290-290° C. and a die temperature of 300° C. The screw rotation rate was 350 revolutions per minute (rpm). The extrudate was cooled in a water bath and pelletized. Pellets were conditioned at 110° C. for 2-4 hours prior to injection molding or extrusion molding.

Prior to molding the pellets were pre-dried at 110° C. for 2-4 hrs. Molding of samples was performed on an 85 Van Dorn injection molding machine with temperature settings of 260-260-260-260° C. (from throat to nozzle) and a mold temperature of 70° C.

Physical properties were measured using ASTM or ISO test methods as shown in Table 2. Unless specified otherwise, the test standards set forth herein are the most recent standard as of the application filing date. Tests were conducted at room temperature (23 ° C.) unless indicated otherwise. All samples were tested as molded unless indicated otherwise in the tables below.

TABLE 2

| Property | Standard | Conditions | Units |
| --- | --- | --- | --- |
| Melt volume flow rate (MVR) | ISO1133 | 280° C., 2.16 kilogram load, 300 s dwell time | $cm^3/10$ min |
| 5% weight loss temperature | | As determined using thermogravimetric analysis (TGA) | ° C. |
| Notched Charpy impact strength | ISO 179 | | $kJ/m^2$ |
| Water absorption | ISO 62 | After immersion at 23° C. for 24 hours | % |
| Water absorption | ISO 62 | At 50% relative humidity and 23° C. for 24 hours | % |
| Density | | | $g/cm^3$ |
| Tensile Modulus | ISO 527 | As determined at 80° C. or 23° C. | MPa |
| Vicat softening temperature | ISO 306 | 10A at heating rate of 50 ° C./h | ° C. |

Various compositions and the corresponding physical properties are shown in the Tables below. For each composition, the amount of each component is provided in parts by weight (pbw), based on the total weight of the composition, and may not total 100.

As comparative examples, PPE/PA-1 and PPE/PA-2 were characterized in terms of their theoretical saturated moisture absorption in air at 23° C. and 50% relative humidity, their melt volume flow rate (MVR), and their notched Charpy impact strength. The results are shown in Table 3. As used herein, "theoretical moisture absorption" is defined as the saturated moisture absorption in air (23° C/50% RH) of polyamide x polyamide loading.

TABLE 3

| Components | CE1 | CE2 |
|---|---|---|
| PPE/PA-1 | 100 | |
| PPE/PA-2 | | 100 |
| Properties | | |
| Theoretical saturated moisture absorption | 1.72 | 1.33 |
| MVR | 25.3 | 11.5 |
| Notched Charpy impact strength | 20.1 | 17.2 |

As shown in Table 3, PPE/PA-2 has a lower theoretical saturated moisture absorption and a lower MVR compared to PPE/PA-1. This is attributed to PPE/PA-2 having a lower polyamide content relative to PPE/PA-1. With these comparative examples in mind, the present inventors sought to provide a new poly(phenylene ether)/polyamide matrix resin having a well-balanced performance, specifically achieving high melt flow and exhibiting low moisture absorption simultaneously.

Examples 1-1 to 1-3

The compositions and properties of examples 1-1 to 1-3 are shown in Table 4.

TABLE 4

| Components | 1-1* | 1-2* | 1-3* |
|---|---|---|---|
| PPE-1 | 20.2 | 20.2 | |
| PPE-2 | | | 20.2 |
| PA-1 | 68.99 | | 68.99 |
| PA-2 | | 68.99 | |
| PETS | 0.3 | 0.3 | 0.3 |
| CuI | 0.05 | 0.05 | 0.05 |
| CAA | 1.06 | 1.06 | 1.06 |
| SEP-LS | | | 1.01 |
| SEP-HS | 1.01 | 1.01 | |
| PHBPP | 0.51 | 0.51 | 0.51 |
| SEBS 1651 | 3.03 | 3.03 | 3.03 |
| KI | 0.3 | 0.3 | 0.3 |
| PELTP | 0.51 | 0.51 | 0.51 |
| Furandione | 4.04 | 4.04 | 4.04 |
| Properties | | | |
| MVR | 26.6 | 38.6 | 25.3 |
| 5% weight loss T | 415 | 407 | 420 |
| Notched Charpy IS | 20.4 | 20.4 | 20.1 |
| Water absorption (immersion) | 0.66 | 0.84 | 0.58 |

*indicates a comparative example

As shown in Table 4, simply increasing the amount of polyamide present in the composition could achieve a high melt flow, however water uptake was also increased, which was undesirable. It can be seen in Table 4 that using a lower intrinsic viscosity PPE as in 1-1 provides a slightly enhanced MVR, for example as compared to example 1-3. The notched Charpy impact strength was similar across these three examples. Comparing examples 1-2 and 1-3, it can be seen that using a high flow polyamide as in example 1-2 can provide a higher MVR, but also results in high water absorption. Additionally, the 5% weight loss temperature determined by TGA was also lower for each of examples 1-1 and 1-2 compared to example 1-3.

Examples 2-1 to 2-6

The compositions and properties of examples 2-1 through 2-6 are shown in Table 5. These examples assess the effect of different polyamide loadings on melt flow, impact performance, and moisture absorption.

TABLE 5

| Components | 2-1* | 2-2* | 2-3* | 2-4* | 2-5* | 2-6* |
|---|---|---|---|---|---|---|
| PPE-2 | 37.2 | 27.2 | 32.2 | 32.2 | 27.2 | 22.2 |
| PA-1 | | | | 55 | 60 | 65 |
| PA-2 | 50 | 60 | 55 | | | |
| PETS | 0.3 | 0.3 | 0.3 | 0.3 | 0.3 | 0.3 |
| CuI | 0.05 | 0.05 | 0.05 | 0.05 | 0.05 | 0.05 |
| CAA | 1.06 | 1.06 | 1.06 | 1.06 | 1.06 | 1.06 |
| SEP-HS | 1.01 | 1.01 | 1.01 | 1.01 | 1.01 | 1.01 |
| PHBPP | 0.51 | 0.51 | 0.51 | 0.51 | 0.51 | 0.51 |
| SEBS 1651 | 3.03 | 3.03 | 3.03 | 3.03 | 3.03 | 3.03 |
| KI | 0.3 | 0.3 | 0.3 | 0.3 | 0.3 | 0.3 |
| PELTP | 0.51 | 0.51 | 0.51 | 0.51 | 0.51 | 0.51 |
| Furandione | 4.04 | 4.04 | 4.04 | 4.04 | 4.04 | 4.04 |
| CB | 2 | 2 | 2 | 2 | 2 | 2 |
| Properties | | | | | | |
| MVR | 11.8 | 23 | 16.3 | 7.8 | 10.2 | 16.1 |
| Density | | | | | | |
| Notched Charpy IS | 14.5 | 21.1 | 20.3 | 22.7 | 22.1 | 20.5 |
| Theoretical Saturated Moisture absorption (23° C., 50% RH) | 1.35 | 1.62 | 1.48 | 1.38 | 1.5 | 1.63 |

*indicates a comparative example

As can be seen in Table 5, examples 2-1 through 2-3 included polyamide-6 loadings of 55, 60 and 55 pbw, respectively. Examples 2-4 through 2-6 included polyamide-6,6 loadings of 55, 60, and 65 pbw, respectively. The examples shown in Table 5 demonstrate that a decrease in the polyamide loading leads to less moisture absorption and lower MVR. Reduced notched Charpy impact strength was also observed upon lowering the polyamide-6 loading from 60 to 50 pbw (i.e., examples 3-2 to 3-1), whereas notched Charpy impact strength was not observed to be significantly affected by a decrease in polyamide-6,6 loading (i.e., in examples 3-4 through 3-6). These examples suggest that the polyamide loading should generally be minimized to suppress moisture absorption.

Examples 3-1 through 3-8

The compositions and properties of examples 3-1 through 3-8 are shown in Table 6. These examples assess the effect of a particular flow promoter, bisphenoxyethanol fluorene (BPEF), on melt flow, impact performance, and moisture absorption.

TABLE 6

| Components | 3-1* | 3-2 | 3-3 | 3-4 | 3-5* | 3-6 | 3-7 | 3-8 |
|---|---|---|---|---|---|---|---|---|
| PPE-2 | 32.2 | 31.2 | 29.7 | 27.2 | 32.2 | 31.2 | 29.7 | 27.2 |
| PA-1 | | | | | 55 | 55 | 55 | 55 |
| PA-2 | 55 | 55 | 55 | 55 | | | | |
| BPEF | | 1 | 2.5 | 5 | | 1 | 2.5 | 5 |
| PETS | 0.3 | 0.3 | 0.3 | 0.3 | 0.3 | 0.3 | 0.3 | 0.3 |
| CAA | 1 | 1 | 1 | 1 | 1 | 1 | 1 | 1 |

TABLE 6-continued

| Components | 3-1* | 3-2 | 3-3 | 3-4 | 3-5* | 3-6 | 3-7 | 3-8 |
|---|---|---|---|---|---|---|---|---|
| SEP-HS | 1 | 1 | 1 | 1 | 1 | 1 | 1 | 1 |
| PHBPP | 0.5 | 0.5 | 0.5 | 0.5 | 0.5 | 0.5 | 0.5 | 0.5 |
| SEBS 1651 | 3 | 3 | 3 | 3 | 3 | 3 | 3 | 3 |
| PELTP | 0.5 | 0.5 | 0.5 | 0.5 | 0.5 | 0.5 | 0.5 | 0.5 |
| Furandione | 4 | 4 | 4 | 4 | 4 | 4 | 4 | 4 |
| CB | 2 | 2 | 2 | 2 | 2 | 2 | 2 | 2 |
| CuI/KI masterbatch† | 1.5 | 1.5 | 1.5 | 1.5 | 1.5 | 1.5 | 1.5 | 1.5 |
| Properties | | | | | | | | |
| MVR | 16.3 | 19.4 | 25.2 | 40.8 | 7.8 | 10.8 | 14.4 | 23.1 |
| Notched Charpy IS | 20.3 | 20.1 | 19.2 | 18.5 | 22.7 | 21.6 | 20.5 | 19.5 |
| Moisture absorption (23° C., 50% RH) | 0.206 | 0.207 | 0.199 | 0.190 | 0.172 | 0.169 | 0.163 | 0.152 |
| 5% weight loss T | 413.7 | 408.9 | 410.5 | 405.7 | 419.3 | 421.2 | 419.3 | 412.6 |

*indicates a comparative example;
†CuI/KI masterbatch includes 0.045% of CuI and 0.15% of KI, with the balance being polyamide-6

As shown in Table 6, examples 3-1 and 3-5 have the same formulation as examples 2-3 and 2-4 in Table 5 above, and serve as baseline comparisons for determining the effect of this particular flow promoter. Examples 3-2 to 3-4 and examples 3-6 to 3-8 each include the flow promoter in an amount of 1, 2.5 and 5 pbw, respectively.

Based on examples shown in Table 6, the BPEF flow promoter appears to be effective as a flow promoter for poly(phenylene ether)/polyamide compositions. Higher loadings of the BPEF led to a higher MVR, as well as decreased moisture absorption. It was also noted that the use of the BPEF resulted in a minor decrease in Charpy impact strength and in the 5% weight loss temperature by TGA. Examples 4-1 through 4-5

The compositions and properties of examples 4-1 through 4-5 are shown in Table 7. The aim of these experiments was to determine the effect of various combinations of a polystyrene (PS-1) having a high melt flow rate and BPEF, and stearyl erucamide and BPEF.

TABLE 7

| Components | 7-1* | 7-2 | 7-3* | 7-4* | 7-5 |
|---|---|---|---|---|---|
| PPE-1 | 28.2 | 19.2 | 18.2 | 24.1 | 33.1 |
| PA-1 | | 50 | 50 | | |
| PA-2 | 40 | | | | |
| PA-3 | | | | 50.8 | 50.8 |
| PS-1 | 15 | 15 | 15 | 10 | |
| Erucamide | | | 4 | 4 | 2 |
| BPEF | | 3 | | | 3 |
| PETS | 4.3 | 0.3 | 0.3 | 0.24 | 0.24 |
| CAA | 1.06 | 1.06 | 1.06 | 0.68 | 0.68 |
| SEP-HS | 1.01 | 1.01 | 1.01 | 6.84 | 6.84 |
| PHBPP | 0.51 | 0.51 | 0.51 | 0.49 | 0.49 |
| SEBS 1651 | 3.03 | 3.03 | 3.03 | | |
| PELTP | 0.51 | 0.51 | 0.51 | 0.49 | 0.49 |
| Furandione | 4.04 | 4.04 | 4.04 | | |
| CB | 2 | 2 | 2 | 2 | 2 |
| KI | 0.3 | 0.3 | 0.3 | 0.29 | 0.29 |
| CuI | 0.05 | 0.05 | 0.05 | 0.05 | 0.05 |
| Properties | | | | | |
| MVR | 27.2 | 29.2 | 43.2 | 41.9 | 38.9 |
| Notched Charpy IS | 3.6 | 8.3 | 4.1 | 4.7 | 13 |
| Moisture absorption (immersion) | 0.233 | 0.203 | 0.228 | 0.242 | 0.261 |
| 5% weight loss T | 410 | 409 | 405 | 404 | 409 |
| Vicat softening T | 191.1 | 236.0 | 234.3 | 236.6 | 233.4 |

*indicates a comparative example

Each of the examples in Table 7 achieved an MVR higher than that of the PPE/PA-1 and PPE/PA-2 comparative materials shown in Table 3. The 5% weight loss temperature for each composition was greater than 400° C. Examples 7-2 and 7-5 exhibit particularly good heat resistance, evidenced by the Vicat softening temperature, and thus these compositions can be useful in auto-structural applications which need to withstand exposure to high temperatures during processing. Overall, it has been shown that keeping the polyamide loading low and adding a flow promoter can provide a balance of low moisture absorption and high melt flow and heat resistance.

As demonstrated by the examples provided herein, the above-described poly(phenylene ether)/polyamide compositions can provide a well-balanced performance of low moisture absorption, high melt flow, high heat resistance and good impact strength.

This disclosure further encompasses the following aspects.

Aspect 1: A composition comprising 10 to 65 weight percent of a poly(phenylene ether); 30 to 70 weight percent of a first polyamide, wherein the first polyamide is polyamide-6, polyamide-6,6, or a combination thereof; 1 to 10 weight percent of a hydrogenated block copolymer of an alkenyl aromatic and a conjugated diene; and 0.5 to 10 weight percent of bisphenoxyethanol fluorene; wherein weight percent of each component is based on the total weight of the composition.

Aspect 2: The composition of aspect 1, wherein the first polyamide is polyamide-6, and the first polyamide is present in an amount of less than or equal to 50 weight percent; or wherein the first polyamide is polyamide-6,6, and the first polyamide is present in an amount of less than or equal to 60 weight percent.

Aspect 3: The composition of aspect 1 or 2, wherein the first polyamide has an amine end group concentration of less than 75 milliequivalents per kilogram, preferably 40 to 70 milliequivalents per kilogram; or an amine end group concentration of greater than 85 milliequivalents per kilogram, preferably 90 to 115 milliequivalents per kilogram.

Aspect 4: The composition of any of aspects 1 to 3, wherein the hydrogenated block copolymer is a polystyrene-poly(ethylene-butylene)-polystyrene triblock copolymer, a polystyrene-poly(ethylene-propylene) diblock copolymer, or a combination thereof, preferably wherein the polystyrene-poly(ethylene-propylene) diblock copolymer has a styrene content of 30 to 45 weight percent.

Aspect 5: The composition of any of aspects 1 to 4, wherein the composition exhibits one or more of the following properties: a notched Charpy impact strength of greater than 5 kilojoules per meter$^2$; a water absorption of less than 1%; and a melt volume flow rate of greater than 10 cm3/10 minutes.

Aspect 6: The composition of any of aspects 1 to 5, further comprising: 1 to 10 weight percent of stearyl erucamide; or 1 to 30 weight percent of a polystyrene homopolymer.

Aspect 7: The composition of any of aspects 1 to 6, comprising 15 to 25 weight percent of the poly(phenylene ether); 45 to 55 weight percent of the first polyamide; and 1 to 10 weight percent of the hydrogenated block copolymer of an alkenyl aromatic and a conjugated diene, wherein the hydrogenated block copolymer comprises a combination of a polystyrene-poly(ethylene-butylene)-polystyrene triblock copolymer and a polystyrene-poly(ethylene-propylene) diblock copolymer; 10 to 20 weight percent of a polystyrene homopolymer; and 0.5 to 5 weight percent of bisphenoxyethanol fluorene.

Aspect 8: The composition of any of aspects 1 to 6, comprising 25 to 35 weight percent of the poly(phenylene ether); 50 to 60 weight percent of the first polyamide; 1 to 10 weight percent of the hydrogenated block copolymer of an alkenyl aromatic and a conjugated diene, wherein the hydrogenated block copolymer comprises a combination of a polystyrene-poly(ethylene-butylene)-polystyrene triblock copolymer and a polystyrene-poly(ethylene-propylene) diblock copolymer; and 0.5 to 10 weight percent of bisphenoxyethanol fluorene.

Aspect 9: The composition of any of aspects 1 to 6 comprising 10 to 40 weight percent of the poly(phenylene ether); 40 to 55 weight percent of the first polyamide; 1 to 10 weight percent of the hydrogenated block copolymer of an alkenyl aromatic and a conjugated diene, wherein the hydrogenated block copolymer comprises a polystyrene-poly(ethylene-propylene) diblock copolymer; 1 to 5 weight percent of stearyl erucamide; and 0.5 to 5 weight percent of bisphenoxyethanol fluorene.

Aspect 10: The composition of any of aspects 1 to 9, further comprising 0.1 to 10 weight percent of one or more additives.

Aspect 11: A method for the manufacture of the composition of any of aspects 1 to 10, the method comprising melt mixing the components of the composition.

Aspect 12: An article formed from the composition of any of aspects 1 to 10, preferably wherein the article is an automotive component.

Aspect 13: A reinforced thermoplastic composite comprising 20 to 80 weight percent of the composition of any of aspects 1 to 10; and 20 to 80 weight percent of a reinforcing carbon fiber; wherein weight percent is based on the total weight of the composite.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

All ranges disclosed herein are inclusive of the endpoints, and the endpoints are independently combinable with each other. "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity, and are to be construed to cover both the singular and the plural, unless otherwise indicated herein or clearly contradicted by context. "Or" means "and/or" unless clearly stated otherwise. Reference throughout the specification to "some aspects", "an aspect", and so forth, means that a particular element described in connection with the aspect is included in at least one aspect described herein, and may or may not be present in other aspects. The term "combination thereof" as used herein includes one or more of the listed elements, and is open, allowing the presence of one or more like elements not named. In addition, it is to be understood that the described elements may be combined in any suitable manner in the various aspects.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Compounds are described using standard nomenclature. For example, any position not substituted by any indicated group is understood to have its valency filled by a bond as indicated, or a hydrogen atom. A dash ("—") that is not between two letters or symbols is used to indicate a point of attachment for a substituent. For example, -CHO is attached through carbon of the carbonyl group.

As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. The term "alkyl" means a branched or straight chain, saturated aliphatic hydrocarbon group, e.g., methyl, ethyl, n-propyl, i-propyl, n-butyl, s-butyl, t-butyl, n-pentyl, s-pentyl, and n- and s-hexyl. "Alkenyl" means a straight or branched chain, monovalent hydrocarbon group having at least one carbon-carbon double bond (e.g., ethenyl (—HC=CH$_2$)). "Alkoxy" means an alkyl group that is linked via an oxygen (i.e., alkyl-O—), for example methoxy, ethoxy, and sec-butyloxy groups. "Alkylene" means a straight or branched chain, saturated, divalent aliphatic hydrocarbon group (e.g., methylene (—CH$_2$—) or, propylene (—(CH$_2$)$_3$—)). "Cycloalkylene" means a divalent cyclic alkylene group, —C$_n$H$_{2n-x}$ wherein x is the number of hydrogens replaced by cyclization(s). "Cycloalkenyl" means a monovalent group having one or more rings and one or more carbon-carbon double bonds in the ring, wherein all ring members are carbon (e.g., cyclopentyl and cyclohexyl). "Aryl" means an aromatic hydrocarbon group containing the specified number of carbon atoms, such as phenyl, tropone, indanyl, or naphthyl. "Arylene" means a divalent aryl group. "Alkylarylene" means an arylene group substituted with an alkyl group. "Arylalkylene" means an alkylene group substituted with an aryl group (e.g., benzyl). The prefix "halo" means a group or compound including one more of a fluoro, chloro, bromo, or iodo substituent. A combination of different halo groups (e.g., bromo and fluoro), or only chloro groups can be present. The prefix "hetero" means that the compound or group includes at least one ring member that is a heteroatom (e.g., 1, 2, or 3 heteroatom(s)), wherein the heteroatom(s) is each independently N, O, S, Si, or P. "Substituted"means that the compound or group is substituted with at least one (e.g., 1, 2, 3, or 4) substituents that can each independently be a $C_{1-9}$ alkoxy, a $C_{1-9}$ haloalkoxy, a nitro (—$NO_2$), a cyano (—CN), a $C_{1-6}$ alkyl sulfonyl (—S(=O)$_2$-alkyl), a $C_{6-12}$ aryl sulfonyl (—S(=O)$_2$-aryl), a thiol (—SH), a thiocyano (—SCN), a tosyl ($CH_3C_6H_4S_{02}$—), a $C_{3-12}$ cycloalkyl, a $C_{2-12}$ alkenyl, a $C_{5-12}$ cycloalkenyl, a $C_{6-12}$ aryl, a $C_{7-13}$ arylalkylene, a $C_{4-12}$ heterocycloalkyl, and a $C_{3-12}$ heteroaryl instead of hydrogen, provided that the substituted atom's normal valence is not exceeded. The number of carbon atoms indicated in a group is exclusive of any substituents. For example —$CH_2CH_2CN$ is a $C_2$ alkyl group substituted with a nitrile.

While particular aspects have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A composition comprising
   10 to 65 weight percent of a poly(phenylene ether);
   30 to 70 weight percent of a first polyamide, wherein the first polyamide is polyamide-6, polyamide-6,6, or a combination thereof, and wherein the first polyamide has an amine end group concentratio of 40 to 70 milliequivalents per kilogram;
   1 to 10 weight percent of a hydrogenated block copolymer of an alkenyl aromatic and a conjugated diene; and
   0.5 to 10 weight percent of bisphenoxyethanol fluorene;
   wherein weight percent of each component is based on the total weight of the composition;
   wherein the composition further comprises:
     1 to 10 weight percent of stearyl erucamide; or
     1 to 30 weight percent of a polystyrene homopolymer; and
   wherein the composition exhibits each of the following properties;
     a notched Charpy impact strength of greater than 5 kilojoules per meter$^2$, as determined according to ISO 179; and
     a water absorption of less than 0.5%, as determined according to ISO 62; and
     a melt volume flow rate of greater than 15 cm$^3$/10 minutes, as determined according to ISO 1133 at 280° C. under a 2.16 kilogram load and a 300 second dwell time.

2. The composition of claim 1,
   wherein the first polyamide is polyamide-6, and the first polyamide is present in an amount of 30 to less than or equal to 50 weight percent; or
   wherein the first polyamide is polyamide-6,6, and the first polyamide is present in an amount of 30 to less than or equal to 60 weight percent.

3. The composition of claim 1, wherein the hydrogenated block copolymer is a polystyrene-poly(ethylene-butylene)-polystyrene triblock copolymer, a polystyrene-poly(ethylene-propylene) diblock copolymer, or a combination thereof.

4. The composition of claim 1, comprising
   15 to 25 weight percent of the poly(phenylene ether);
   45 to 55 weight percent of the first polyamide; and
   1 to 10 weight percent of the hydrogenated block copolymer of an alkenyl aromatic and a conjugated diene, wherein the hydrogenated block copolymer comprises a combination of a polystyrene-poly(ethylene-butylene)-polystyrene triblock copolymer and a polystyrene-poly(ethylene-propylene) diblock copolymer;
   10 to 20 weight percent of the polystyrene homopolymer; and
   0.5 to 5 weight percent of bisphenoxyethanol fluorene.

5. The composition of claim 1, comprising
   25 to 35 weight percent of the poly(phenylene ether);
   50 to 60 weight percent of the first polyamide;
   1 to 10 weight percent of the hydrogenated block copolymer of an alkenyl aromatic and a conjugated diene, wherein the hydrogenated block copolymer comprises a combination of a polystyrene-poly(ethylene-butylene)-polystyrene triblock copolymer and a polystyrene-poly(ethylene-propylene) diblock copolymer; and
   0.5 to 10 weight percent of bisphenoxyethanol fluorene.

6. The composition of claim 1 comprising
   10 to 40 weight percent of the poly(phenylene ether);
   40 to 55 weight percent of the first polyamide;
   1 to 10 weight percent of the hydrogenated block copolymer of an alkenyl aromatic and a conjugated diene, wherein the hydrogenated block copolymer comprises a polystyrene-poly(ethylene-propylene) diblock copolymer;
   1 to 5 weight percent of stearyl erucamide; and
   0.5 to 5 weight percent of bisphenoxyethanol fluorene.

7. The composition of claim 1, further comprising 0.1 to 10 weight percent of one or more additives.

8. A method for the manufacture of the composition of claim 1, the method comprising melt mixing the components of the composition.

9. An article formed from the composition of claim 1.

10. A reinforced thermoplastic composite comprising
    20 to 80 weight percent of the composition of claims 1; and
    20 to 80 weight percent of a reinforcing carbon fiber;
    wherein weight percent is based on the total weight of the composite.

11. The article of claim 9, wherein the article is an automotive component.

* * * * *